Feb. 27, 1945. L. WALLERSTEIN, JR 2,370,597
BRAKE CONTROLLING DEVICE
Filed Oct. 29, 1942 2 Sheets-Sheet 1
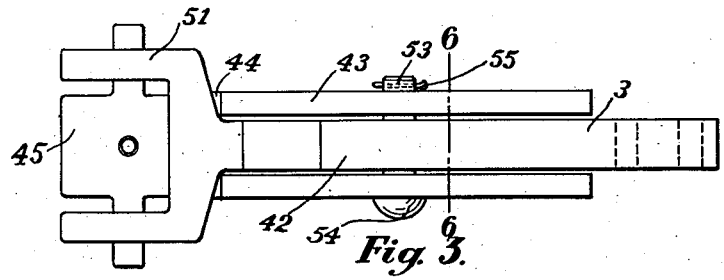
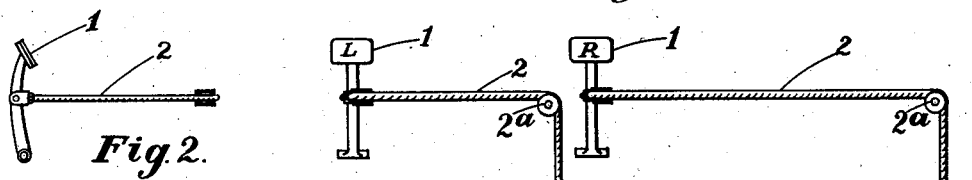
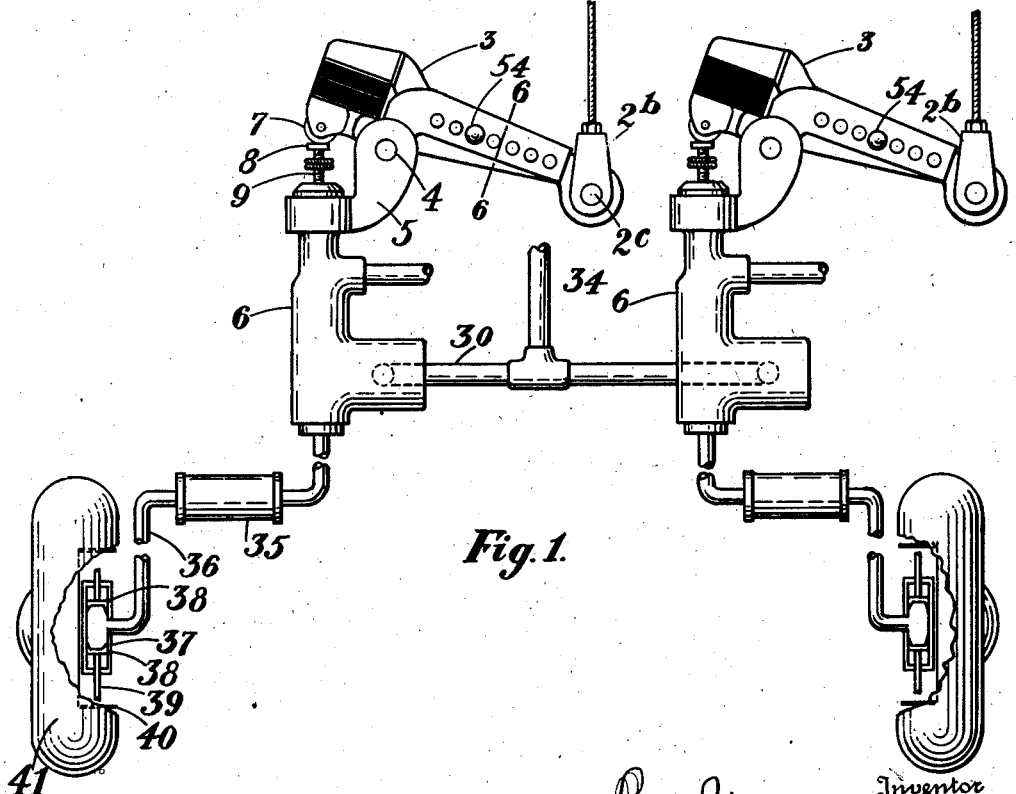

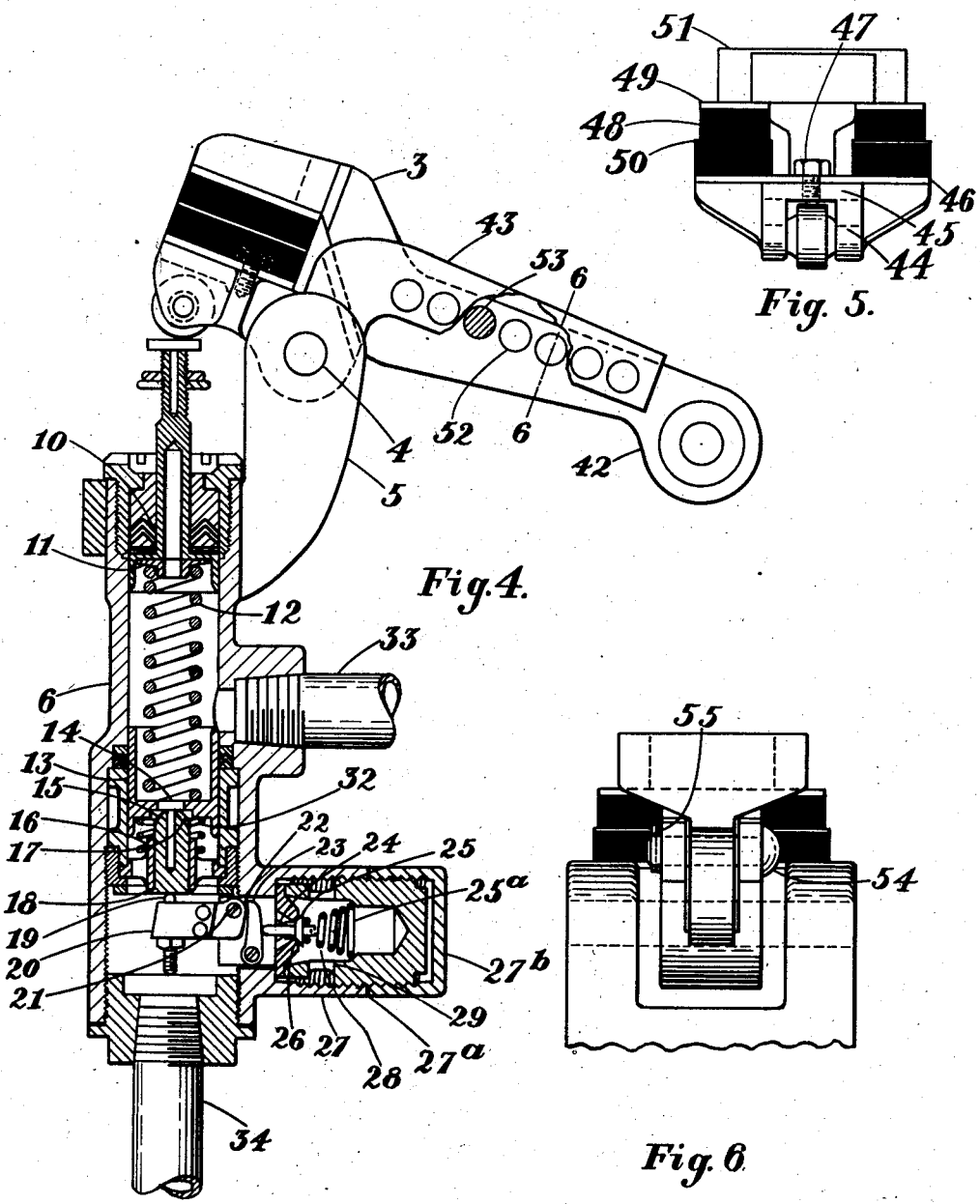

Patented Feb. 27, 1945

2,370,597

UNITED STATES PATENT OFFICE 2,370,597

BRAKE CONTROLLING DEVICE

Leon Wallerstein, Jr., Erie, Pa., assignor to Lord Manufacturing Company, Erie, Pa., a corporation of Pennsylvania Application October 29, 1942, Serial No. 463,738

8 Claims. (Cl. 188—217)

The present invention is designed to improve brake controls, and as exemplified is arranged for controlling the brakes on an airplane.

With the airplane structure there is encountered such flexibility of the frame that the brake response to the controlling brake pedals is apt to be different, and consequently if the operator moves each brake pedal the same distance, the brake at one side will be greater than that at the other and a consequent turning movement is given to the plane. With the present invention the mechanism is so formed as to provide an equal brake response with a uniform movement of the pedals. Features and details of the invention will appear from the specification and claims.

A preferred embodiment of the invention is illustrated in the accompanying drawings as follows:

Fig. 1 shows an elevation of the brake control mechanism parts being in perspective to better show construction.

Fig. 2 a side elevation of a pedal lever.

Fig. 3 a plan view of one of the control levers.

Fig. 4 an elevation of the control mechanism, partly in section.

Fig. 5 an end view of the control lever from the left of Figs. 1 and 4.

Fig. 6 a section on the line 6—6 in Figs. 1, 3 and 4.

1 marks the brake pedals, 2 cables leading from and actuated by the pedals. As shown, the cables are led over pulleys 2a to clevices 2b secured at the end of a control lever 3 by means of pins 2c. The brake mechanism leading from each pedal is similar. The lever 3 has trunnions 4 which extend into a bracket 5 mounted on a control cylinder 6.

The hydraulic control means is of common construction and comprises a wheel 7. The wheel 7, operating on the end of the lever, contacts an adjustable screw 8 which extends into a pin 9 actuating the control mechanism. The pin 9 extends through a gland 10 to a plunger 11 forming a seat for a control for a spring 12. The spring engages a plunger 13 slidingly mounted in the cylinder and having a valve opening 14. A valve 15 is slidingly mounted in a guide 16 fixed in the cylinder and has a tapered end 17 which enters the opening 14 and operates as a closure for that opening.

The lower end of the valve 15 has a shoulder 18 which limits its upward movement in the guide 16. The lower end of the valve 15 engages an adjustable pin 19. The pin is carried by a rocker arm 20 pivoted on a pin 21. The end of the rocker arm has a cam surface 22 which engages a rocker lever 23 pivotally mounted in the cylinder frame. The lever 23 engages a pin 24 which extends from a valve 25, the valve operating on a valve seat 26. The valve seat is arranged in a head 27 on the cylinder frame and a chamber 28 is mounted on the head. A spring 25a operates on the valve and tends to close it.

Ports 29 lead into the chamber 28 and are connected with a branch supply pipe 30. The branch pipes 30, one leading from each chamber, connect with a supply pipe 31 which in turn leads from a supply pump, not shown. A spring 32 tends to lift the plunger 13 when pressure is taken off the spring 12 and a pipe 33 leads to the supply pump, not shown, so that when the valve 15 is open there is a by-pass back to the pump by way of the pipe 33.

Liquid is discharged through a pipe 34 and passes through a de-booster 35 which has a limiting control of the pressure on the brake system, and a pipe 36 leads from the de-booster to the cylinder 37. Plungers 38 are arranged in the cylinder 37. Stems 39 extend from the plunger and engage the operating parts of the brake 40, controlling the wheels 41.

In the operation of the controlling means, the control lever is depressed, thus putting pressure on the spring 12. This actuates the plunger 13 moving it against the valve 15 and closing the valve opening. The downward movement, continuing through the valve 15, is carried to the rock arm 20 which, through its action and the lever 23, opens the supply valve 25. Liquid then moves into the lower part of the cylinder and as it moves into the cylinder it communicates through the system to the brake cylinders, building up a pressure in the lower part of the cylinder which is communicated to the plunger 13 formed by the valve 15. The plunger 13 therefore moves in response to this pressure to a point where it closes the supply valve at that spring pressure, thus maintaining the brake pressure at this point.

If the spring is further depressed, the supply valve 25 is opened and the added pressure is delivered to the system until the movement of the plunger 13 at the new spring pressure will again close the valve. Thus the brake pressure is controlled by the movement on the spring and the brake lever is more or less sensitive to this movement and pressure.

The present invention, therefore, is to provide a control lever mechanism, as before stated, which will equalize the pedal movements necessary to get equal brake responses and is adjustable to accomplish this purpose.

The control lever has an actuating member 42 and an actuated member 43. The actuated member has an extension 44 and a cross member 45. A plate 46 rests on the cross member. A bolt 47 extends through the plate and secures it on the cross member 45.

A rubber cushion 48 is mounted on the plate 46 and preferably secured thereto by bonding. A plate 49 is arranged on the upper face of the cushion and secured thereto preferably by bonding. Intermediate plates 50 are preferably provided to stiffen the cushion. The upper plate 49 is engaged by forks 51 on the end of the actuating member 42. The actuated member 43 is channel shaped, and the sides of the channel extend over the actuating member 42. These members have registering openings 52. A pin 53 is adapted to extend through any of the perforations. It is provided with a head 54 at one end and secured in place by a cotter pin 55. The leverage exerted through the pedal and the lever 3 remains constant regardless of the setting of the pin 53.

In order to obtain equal effectiveness on the brakes and thus compensate for any difference in communicating the movement of the lever to the brakes, such as variations in flexibility of the frame, it is necessary to add or reduce the cushioning action an amount equal to the variation occasioned by the difference in flexibility. By moving the pin 53 to different adjustments, this may be accomplished. Thus by placing the pin nearer the cushion, the cushion is depressed to a greater degree with the same pedal pressure and if this adjustment for greater compression of the cushion is made on the side having the stiffer frame, the yielding of the rubber can be made to compensate for the lack of yielding of the frame so that the yielding on both pedals will be alike and the travel on both pedals alike.

It will be understood in making these adjustments that it may be desirable to adjust both devices slightly, making the stiffer side softer and the more flexible side stiffer so far as the cushion action is concerned.

What I claim as new is:

1. In a brake controlling device comprising a pressure controlled pressure exerting means, a brake controlled by the means, a lever exerting pressure on the means comprising an actuating member and an actuated member, the actuated member pressing the means, a pivotal mounting for the actuated member, a pivotal connection between the members, the pivotal connection being movable with the lever, and a spring between the members communicating pressure from the actuating member to the actuated member.

2. In a brake controlling device comprising a pressure controlled pressure exerting means, a brake controlled by the means, a lever exerting pressure on the means comprising an actuating member and an actuated member, the actuated member pressing the means, a pivotal mounting for the actuated member, an adjustable pivotal connection between the members providing a varying lever relation between the members, and a spring between the members communicating pressure from the actuating member to the actuated member.

3. In a brake controlling device comprising a pressure controlled pressure exerting means, a brake controlled by the means, a lever exerting pressure on the means comprising an actuating member and an actuated member, the actuated member pressing the means, a pivotal mounting for the actuated member, a pivotal connection between the members providing a lever relation between the members, the pivotal connection being movable with the lever, and a rubber cushion between the members communicating pressure from the actuating member to the actuated member.

4. In a brake controlling device comprising a pressure controlled pressure exerting means, a brake controlled by the means, a lever exerting pressure on the means comprising an actuating member and an actuated member, the actuated member pressing the means, a pivotal mounting for the actuated member, a pivotal connection between the members providing a lever relation between the members, said members being provided with a series of openings registering with each other, and a pin extending through selected registering openings, the selected opening providing the desired lever relation between the members, and a spring between the members communicating pressure from the actuating member to the actuated member.

5. In a brake controlling device comprising a pressure controlled pressure exerting means, a brake controlled by the means, a lever exerting pressure on the means comprising an actuating member and an actuated member, the actuated member pressing the means, a pivotal mounting for the actuated member, a pivotal connection between the members, the pivotal connection being movable with the lever, a spring between the members communicating pressure from the actuating member to the actuated member, and a pedal actuating the lever.

6. In a brake controlling device, a pair of brake controlling mechanism, each comprising a pressure controlled pressure exerting means, a brake controlled by the means, a lever exerting pressure on the means comprising an actuating member and an actuated member, the actuated member pressing the means, a pivotal mounting for the actuated member, an adjustable pivotal connection between the members providing a varying lever relation between the members, and a spring between the members communicating pressure from the actuating member to the actuated member.

7. In a brake controlling device, a pair of brake controlling mechanism, each comprising a pressure controlled pressure exerting means, a brake controlled by the means, a lever exerting pressure on the means comprising an actuating member and an actuated member, the actuated member pressing the means, a pivotal mounting for the actuated member, a pivotal connection between the members providing a lever relation between the members, said members being provided with a series of openings registering with each other, and a pin extending through selected registering openings, the selected opening providing the desired lever relation between the members, and a spring between the members communicating pressure from the actuating member to the actuated member.

8. In a brake controlling device, a pair of brake controlling mechanism, each comprising a pressure controlled pressure exerting means, a brake controlled by the means, a lever exerting pressure on the means comprising an actuating member and an actuated member, the actuated member pressing the means, a pivotal mounting for the actuated member, a pivotal connection between the members providing a lever relation between the members, said members being provided with a series of openings registering with each other, and a pin extending through selected registering openings, the selected opening providing the desired lever relation between the members, and a rubber cushion between the members communicating pressure from the actuating to the actuated member.

LEON WALLERSTEIN, Jr.